US010659552B2

(12) United States Patent
Wang et al.

(10) Patent No.: US 10,659,552 B2
(45) Date of Patent: May 19, 2020

(54) DEVICE AND METHOD FOR MONITORING SERVER HEALTH

(71) Applicant: ALIBABA GROUP HOLDING LIMITED, George Town, Grand Cayman (KY)

(72) Inventors: Qian Wang, Beijing (CN); Zhuo Chen, Beijing (CN); Ziang Chen, Hangzhou (CN); Jiaming Wu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 74 days.

(21) Appl. No.: 15/170,654

(22) Filed: Jun. 1, 2016

(65) Prior Publication Data
US 2016/0360001 A1 Dec. 8, 2016

(30) Foreign Application Priority Data

Jun. 2, 2015 (CN) .......................... 2015 1 0296417

(51) Int. Cl.
*H04L 29/08* (2006.01)
*H04L 12/26* (2006.01)
*H04L 12/803* (2013.01)
*H04L 12/911* (2013.01)

(52) U.S. Cl.
CPC ........ *H04L 67/2842* (2013.01); *H04L 43/065* (2013.01); *H04L 43/0817* (2013.01); *H04L 67/1002* (2013.01); *H04L 67/1008* (2013.01); *H04L 67/1029* (2013.01); *H04L 47/125* (2013.01); *H04L 47/78* (2013.01)

(58) Field of Classification Search
CPC ............. H04L 67/1002; H04L 67/1029; H04L 47/125; H04L 67/2842
See application file for complete search history.

(56) References Cited

U.S. PATENT DOCUMENTS

| 6,738,811 B1 | 5/2004 | Liang |
| 6,993,686 B1 | 1/2006 | Groenendaal et al. |
| 7,107,339 B1 | 9/2006 | Wolters |

(Continued)

FOREIGN PATENT DOCUMENTS

| CN | 101610211 A | 12/2009 |
| CN | 102638561 A | 8/2012 |

(Continued)

OTHER PUBLICATIONS

PCT International Search Report and Written Opinion dated Aug. 30, 2016, issued in corresponding International Application No. PCT/US16/35292 (11 pages).

(Continued)

*Primary Examiner* — Jeong S Park
(74) *Attorney, Agent, or Firm* — Finnegan, Henderson, Farabow, Garrett & Dunner, LLP

(57) ABSTRACT

A method for monitoring health of a server is disclosed. The method is performed by a cache device and includes: acquiring information related to results of health checkups on the server based on an inquiry from a load-balancing device about the results of health checkups on the server; and transmitting the information related to results of the health checkups on the server to the load-balancing device.

26 Claims, 13 Drawing Sheets

(56) References Cited

U.S. PATENT DOCUMENTS

| | | |
|---|---|---|
| 7,313,735 B1 | 12/2007 | Levergood et al. |
| 8,676,958 B1 | 3/2014 | Hendon et al. |
| 8,745,221 B1 | 6/2014 | Willbanks |
| 9,871,712 B1 * | 1/2018 | Sorenson, III ...... H04L 43/0817 |
| 2003/0212928 A1 | 11/2003 | Srivastava et al. |
| 2003/0225880 A1 | 12/2003 | Srivastava et al. |
| 2003/0229804 A1 | 12/2003 | Srivastava et al. |
| 2003/0236880 A1 | 12/2003 | Srivastava et al. |
| 2005/0228856 A1 * | 10/2005 | Swildens ................... G06F 9/50 709/200 |
| 2007/0226294 A1 * | 9/2007 | Pruitt ................ H04L 29/12113 709/203 |
| 2008/0134046 A1 | 6/2008 | Gray et al. |
| 2009/0006884 A1 | 1/2009 | Cahill et al. |
| 2009/0187654 A1 | 7/2009 | Raja et al. |
| 2011/0153722 A1 | 6/2011 | Choudhary et al. |
| 2012/0066371 A1 * | 3/2012 | Patel ................... H04L 67/1031 709/224 |
| 2012/0159235 A1 | 6/2012 | Suganthi et al. |
| 2012/0166630 A1 * | 6/2012 | Cho ...................... G06F 9/5083 709/224 |
| 2012/0185557 A1 | 7/2012 | Di Marco et al. |
| 2013/0036195 A1 * | 2/2013 | Tanaka ................ H04L 41/5061 709/217 |
| 2013/0315070 A1 | 11/2013 | Muthiah et al. |
| 2015/0032691 A1 | 1/2015 | Hall et al. |
| 2015/0081848 A1 * | 3/2015 | Willbanks ............... H04L 67/02 709/219 |
| 2015/0149635 A1 * | 5/2015 | Rajagopalan ....... H04L 67/1014 709/226 |
| 2015/0196841 A1 * | 7/2015 | Lee ....................... A63F 13/355 463/42 |

FOREIGN PATENT DOCUMENTS

| | | |
|---|---|---|
| CN | 102761461 A | 10/2012 |
| CN | 103139247 A | 6/2013 |
| CN | 103873293 A | 6/2014 |
| CN | 104394224 A | 3/2015 |
| WO | WO 2015/091785 A1 | 6/2015 |

OTHER PUBLICATIONS

SIPO First Chinese Search Report issued in corresponding Chinese Application No. 201510296417.1 dated Jan. 14, 2019, 2 pages.

le;2qSIPO First Chinese Office Action issued in corresponding Chinese Application No. 201510296417.1 dated Jan. 28, 2019, 17 pages.

* cited by examiner

DEVICE AND METHOD FOR MONITORING SERVER HEALTH

CROSS-REFERENCE TO RELATED APPLICATIONS

This application is based upon and claims priority to Chinese Patent Application No. 201510296417.1, filed Jun. 2, 2015, the entire contents of which are incorporated herein by reference.

TECHNICAL FIELD

The present disclosure generally relates to the field of computer technology, and more particularly, to a device and method for monitoring server health.

BACKGROUND

Balancing the loads of server is a technique that re-directs flows of visits to several back-end servers to evenly distribute the visits to the servers. In this process, it is important to monitor the health of the servers. A load-balancing device needs to know whether a server is in good condition before it can re-direct visits to that server. Thus, a load-balancing device constantly monitors the health of the servers. A back-end server can be subject to multiple checkups to determine its health. For example, a number of consecutive checks that confirms an abnormal back-end server is now in a normal operation state that exceeds a predetermined threshold value can indicate a server is in a healthy condition. The server can be determined to have returned to a normal state and able to receive re-directed flows of visits. Similarly, a number of consecutive checks that confirms a normal back-end server is now in an abnormal operation state that exceeds a predetermined threshold value can indicate a server is in an unhealthy condition. The server can be determined to be in the abnormal state and unable to receive re-directed flows of visits.

In the related art, a system generally includes a set of load-balancing devices that re-direct flows of visits to back-end servers. For example, a system includes N numbers of load-balancing devices. Each of the N load-balancing devices performs a checkup on a back-end server in a predetermined time interval. The back-end server thus may be checked N times in a time period. If visiting flows increase, the number of the load-balancing devices needs to be increased, for example, from N numbers to M numbers, where M≥N. As the number of the load-balancing devices increases, so is the number of checkups a back-end server receives in the time period. The flows generated from the checkups inevitably add extra workload for the back-end server. The condition would be worsened if the performance of the back-end server is not sufficient to handle the extra flows. Those checkups would also cause the server to generate extra, trash logs in the server. Therefore, there is a need to reduce health checkups and excessive load on the back-end servers.

SUMMARY

Consistent with embodiments of the present disclosure, there is provided a method for monitoring health of a server. The method is performed by a cache device and includes: acquiring information related to results of health checkups on the server based on an inquiry from a load-balancing device about the results of health checkups on the server; and transmitting the information related to results of the health checkups on the server to the load-balancing device.

Consistent with embodiments of the present disclosure, there is provided a method for monitoring health of a server. The method is performed by a load-balancing device and includes: inquiring a cache device about information of health checkups on the server; acquiring information related to results of health checkups on the server returned from the cache device; and processing the information related to the results of health checkups on the server to obtain the results of health checkups on the server.

Consistent with embodiments of the present disclosure, there is provided a cache device for monitoring health of a server. The cache device includes: a first apparatus configured to acquire information related to results of health checkups on the server based on an inquiry from a load-balancing device about the results of health checkups on the server; and a second apparatus configured to transmit the information related to results of the health checkups on the server to the load-balancing device.

Consistent with embodiments of the present disclosure, there is provided a load-balancing device for monitoring health of a server. The load-balancing device includes: a sixth apparatus configured to inquire a cache device about information of health checkups on the server; a seventh apparatus configured to acquire information related to results of health checkups on the server returned from the cache device; and an eighth apparatus configured to process the information related to the results of health checkups on the server to obtain the results of health checkups on the server.

Consistent with embodiments of the present disclosure, there is provided a non-transitory computer readable medium that stores a set of instructions that is executable by at least one processor of a cache device to cause the cache device to perform a method, the method comprising: acquiring information related to results of health checkups on the server based on an inquiry from a load-balancing device about the results of health checkups on the server; and transmitting the information related to results of the health checkups on the server to the load-balancing device.

Consistent with embodiments of the present disclosure, there is provided a non-transitory computer readable medium that stores a set of instructions that is executable by at least one processor of a load-balancing device to cause the load-balancing device to perform a method, the method comprising: inquiring a cache device about information of health checkups on the server; acquiring information related to results of health checkups on the server returned from the cache device; and processing the information related to the results of health checkups on the server to obtain the results of health checkups on the server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
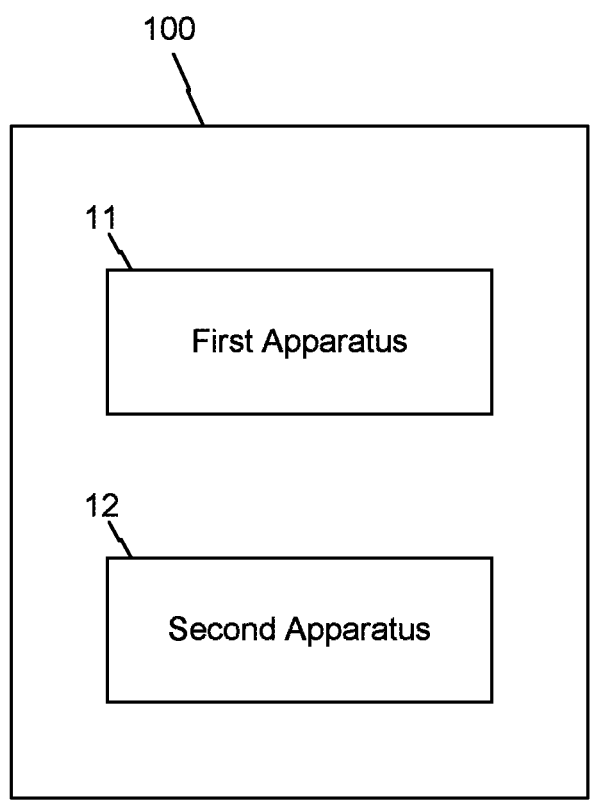
FIG. 1 is a block diagram of an exemplary cache device for monitoring the health of back-end servers, consistent with embodiments of the present disclosure.

FIG. 1 is a block diagram of an exemplary cache device 100 for monitoring the health of back-end servers, consistent with embodiments of the present disclosure. Referring to FIG. 1, the cache device 100 includes a first apparatus 11 and a second apparatus 12.

The first apparatus 11 is configured to acquire information related to results of health checkups on a back-end server based on an inquiry from a load-balancing device about the results of health checkups on the back-end server. The second apparatus 12 is configured to transmit the information related to results of the health checkups to one or more of the load-balancing devices.

In the illustrated embodiment, the cache device 100 includes user devices, network devices, or a combination of user devices and network devices coupled to each other through network. The user devices include any electronic mobile device, such as a smart phone or a PDA that includes a human-machine interface, such as a touch panel that enables communication with users. The electronic mobile devices may include any operation system, such as android system or iOS system. The network devices may be an electronic device that can automatically perform computation and process messages and include one or more microprocessors, an application-specific integrated circuit (ASIC), a field-programmable gate array (FPGA), a digital signal processor (DSP), or other embedded elements. The network devices may include computers, network main machines, single network server, a cluster of network servers, or a cloud formed by multiple servers. In some embodiments, a cloud may be formed by a large number of computers and/or network servers for performing cloud computing. Clouding computing may be a kind of distributed computation and a virtue super computer composed of a set of loosely-coupled computers. The network includes internet, wide area network, metropolitan area network, local area network, VPN network, or ad hoc wireless network, etc. In some embodiments, cache device 100 may include scripts performed on the user devices, network devices, a combination of the user devices and network devices, touch terminals, or a cluster including touch terminals and network devices coupled to each other through network. One of ordinary skill in the art would understand that the cache device 100 explained above is merely examples. Other existing or future devices may be utilized as the cache device 100 if they are consistent with embodiments of the present disclosure.

The apparatuses described above are set to continuously work with each other. One of ordinary skill in the art would understand that "continuously" means that each of apparatuses may work in a real time mode or accordingly in a pre-determined mode, or adjust its work mode in real time. For example, the first apparatus 11 may continuously acquire information related to results of health checkups on a back-end server based on an inquiry from a load-balancing device about the results of health checkups on the back-end server. The second apparatus 12 may continuously transmit the information related to results of the health checkups to one or more of load-balancing devices until the first apparatus 11 ceases to work.

As explained above, the first apparatus 11 is configured to acquire information related to results of health checkups on a back-end server based on an inquiry from a load-balancing device about the results of health checkups on the back-end server. The information related to results of health checkups may include the results of the health checkups, whether the back-end server is being checked, and whether or not results of health checkups exist.

In the illustrated embodiment, whether the back-end server is being checked means that whether there is information indicating another load-balancing device is performing health checkups on the back-end server. Whether or not results of health checkups exist means that there are existing health checkup results stored in the cache device 100 or that there are no health checkup results stored in the cache device 100 and no other load-balancing device is performing health checkup on the back-end server.

The second apparatus 12 is configured to transmit the information related to results of the health checkups to one or more of the load-balancing devices.

In some embodiments, a first load-balancing device may inquire the cache device 100 about the results of health checkups on a back-end server. Based on the inquiry, the first apparatus 11 of the cache device 100 acquires information related to results of the health checkups from a second load-balancing device, which indicates that the second load-balancing device is performing health checkups on the back-end server. The second apparatus 12 informs the first load-balancing device that the back-end server is receiving health checkups. If the cache device 100 has stored the results of health checkups on the back-end server at the time of the inquiry, the second apparatus 12 returns the results to the first load-balancing device. If the cache device 100 does not store results of health checkups on the back-end server and no other load-balancing device is performing health checkups on the back-end server, the second apparatus 12 informs the first load-balancing device that no results are available.

Figure 2:
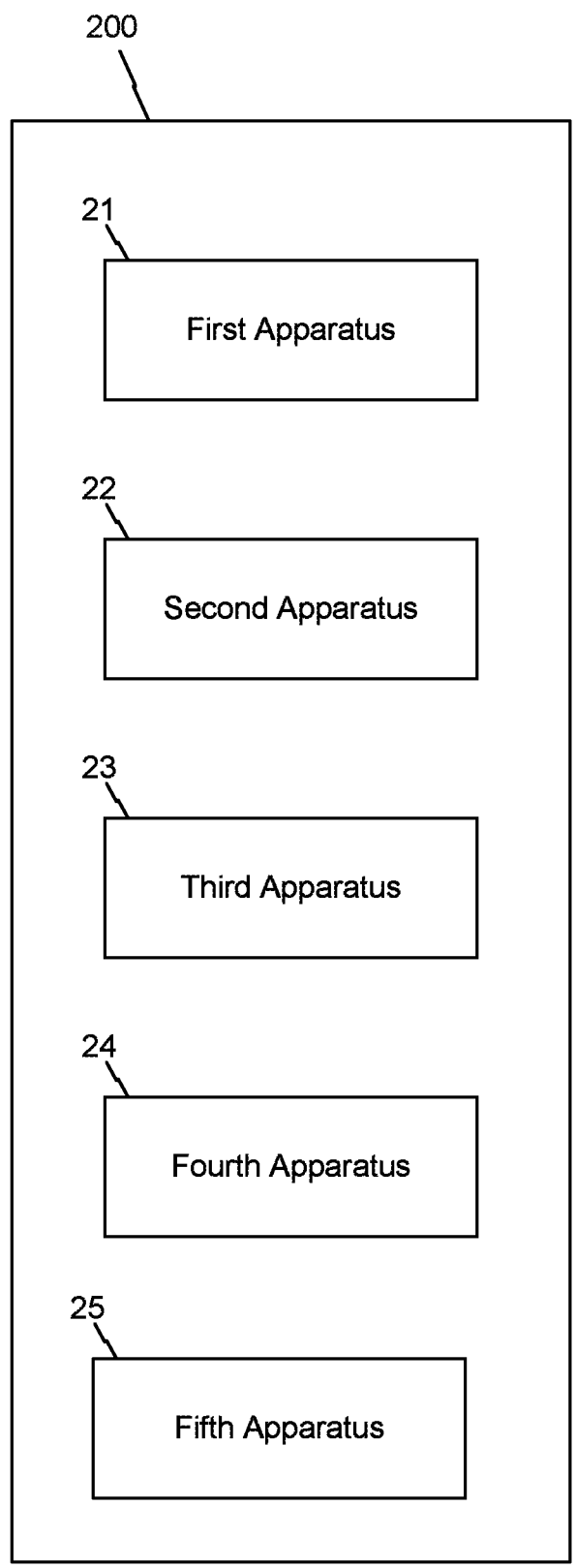
FIG. 2 is a block diagram of another cache device for monitoring the health of back-end servers, consistent with embodiments of the present disclosure.

FIG. 2 is a block diagram of an exemplary cache device 200 for monitoring the health of back-end servers, consistent with embodiments of the present disclosure. Referring to FIG. 2, the device 200 includes a first apparatus 21, a second apparatus 22, a third apparatus 23, and a fourth apparatus 24.

In the illustrated embodiment, the first apparatus 21 and the second apparatus 22 are the same or substantially the same as the first apparatus 11 and the second apparatus 12 shown in FIG. 1. The functions of and actions performed by the first apparatus 21 and the second apparatus 22 are thus omitted for brevity.

The third apparatus 23 is configured to update the information related to the results of health checkups on the back-end server, based on new results of health checkups on the back-end server acquired from a load-balancing device. The fourth apparatus 24 is configured to update the information related to the results of health checkups on the back-end server to include that the load-balancing device is performing health checkups on the back-end server or that the load-balancing device completes health checkups on the back-end server.

In one embodiment, the first apparatus 21 acquires information related to results of health checkups on the back-end server based on an inquiry from the load-balancing device. The inquiry is about the results of health checkups on the back-end server. The second apparatus 22 informs the load-balancing device that there are no results of health checkups on the back-end server. The load-balancing device thus begins to perform health checkups on the back-end server. The fourth apparatus 24 updates the information related to results of health checkups on the back-end server based on information indicating that the load-balancing device is performing health checkups on the back-end server. The updated information includes that there are no results of health checkups available and that the back-end server is being checked. When the load-balancing device completes the health checkups on the back-end server, the third apparatus 23 updates the information related to results of health checkups on the back-end server based on the results of the health checkups that the load-balancing device provides. The updated information related to results of health checkups includes that there are available results of health checkups and that no load-balancing device is performing health checkups on the back-end server. The fourth apparatus 24 updates the information related to results of health checkups on the back-end server based on that the load-balancing device completes the health checkups on the back-end server.

Figure 3:
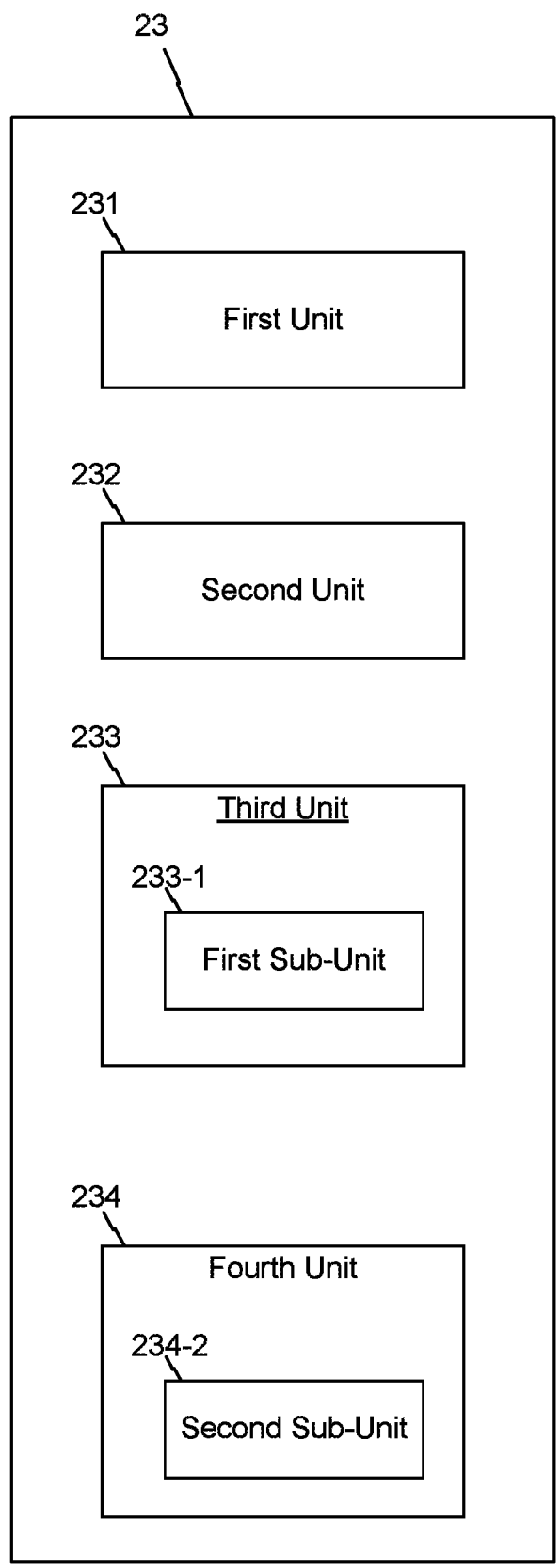
FIG. 3 is a block diagram showing an exemplary third apparatus 23 shown in FIG. 2, consistent with embodiments of the present disclosure.

FIG. 3 is a block diagram showing an exemplary third apparatus 23. In some embodiments, referring to FIG. 3, the third apparatus 23 includes a first unit 231 configured to forward the updated information related to results of health checkups to a distributed cache memory device of cache device 200.

For example, the distributed cache memory device may use Redis, which is open source software for caching or storing and is used to store a plurality of key-value data. For example, the results of health checkups can be saved as <key, value> pair, where the key represents a back-end server and the value represents the results of health checkups. For example, value=1 and value=0 mean the back-end server is in normal and abnormal states, respectively. The cache device 200 may use a "SET" instruction to enter the results of health checkups into Redis data structure. If the results show that a back-end server having an IP address at 1.1.1.1 is in a normal state, the cache device 200 sends a "SET 1.1.1.1 1" instruction to Redis. When the first apparatus 21 is inquired about the results of health checkups, the cache device 200 uses a "GET" instruction of Redis to retrieve the related information. For example, if the inquiry is about the results of health checkups of a back-end server having an IP address at 1.1.1.1, the cache device 200 sends a "GET 1.1.1.1" instruction to Redis. If a response to the "GET 1.1.1.1" instruction is blank, it means that the cache memory device does not store results of health checkups. One of ordinary skill in the art would understand that the above-described distributed storage system and methods of reading from and writing into the cache memory device are exemplary. Other methods of reading from and writing into the cache memory device and other storage systems, whether they are currently available or will be available, are within the scope of this disclosure if they are able to be used in cache device 200.

In one embodiment, referring again to FIG. 3, the third apparatus 23 may further include a second unit 232 configured to update the information related to results of health checkups based on results of health checkups provided by a load-balancing device.

For example, when the second unit 232 receives the results of health checkups on the back-end server provided by the load-balancing device, it can directly update the information related to results of health checkups, which can quickly provide updated information for use and reduce the time required to update.

In some embodiments, the third apparatus 23 may further include a third unit 233 and a fourth unit 234.

The third unit 233 is configured to skip updating the information related to results of health checkups on the back-end server when it receives the results of health checkups for the first time. The fourth unit 234 is configured to update the information related to results of health checkups on the back-end server when it receives the results of health checkups for the second time.

In some embodiments, the third unit 233 includes a first sub-unit 233-1 configured to request the distributed cache memory device to write a main try key therein. The main try key is indicative of a first try to write information related to results of health checkups, and is effective during a predetermined third time period. In some embodiments, the fourth unit 234 includes a second sub-unit 234-2 configured to request the distributed cache memory device to delete the main try key.

The main try key is effective during the predetermined third time period. When it is outside of the predetermined third time period, the main try key is automatically deleted to avoid machine failure that may cause the system to operate abnormally. If the cache memory device receives a request to delete the main try key from the second sub-unit 234-2 within the predetermined third time period, the main try key is deleted. This is because the fourth unit 234 has completed updating the information related to results of health checkups.

The predetermined third time period is not particularly limited and can be set by a user.

In one embodiment, a system includes three load-balancing devices A, B, and C. They are activated to operate in one second from each other. Each of load-balancing devices A, B, and C conducts a health checkup on a back-end server every ten seconds. In one period of ten seconds, a first load-balancing device A makes an inquiry about the information related to results of health checkups on the back-end server. The second apparatus 21 returns a response indicating that the cache device 200 does not have results of health checkups on the back-end server. The response causes the first load-balancing device A to perform health checkups on the back-end server. When first load-balancing device A completes the health checkups and tries to write the results of the health checkups into the cache device 200, the third unit 233 is configured not to update the information related to results of health checkups. That is, the health checkup cache device 200 does not write the results of the health checkups into Redis. Instead, the first unit 231 sends an instruction to Redis asking Redis to enter a main try key k-try to note that there is a first attempt to write results of health checkups of the back-end server. If the main try key k-try exists for more than the third predetermined time period, the cache device 200 automatically deletes the main try key k-try. A second load-balancing device B inquires about the results of health checkups. Because the results from the first load-balancing device A was not written into Redis, the second apparatus 22 still returns a message to the second load-balancing device B indicating that the cache device 200 does not have information related to results of health checkups on the back-end server. The message causes the second load-balancing device B to perform health checkups on the back-end server. Based on this new information, the fourth unit 234 updates the information related to results of health checkups and deletes the main try key k-try. The first unit 231 forwards the results of the health checkups provided by the second load-balancing device B to Redis to be saved therein. Subsequently, a third load-balancing device C or other load-balancing device inquires the cache device 200 about the results of health checkups on the back-end server. The second apparatus 22 returns the information related to the results of the health checkups on the back-end server to the inquiring load-balancing device. The third load-balancing device C thus does not need to perform health checkups on the back-end server.

One of ordinary skill in the art would understand that the number of load-balancing devices, the times those load-balancing devices are activated to work, or the time period or frequency the load-balancing devices conducts health checkups on the back-end server are merely exemplary and can be modified. The present disclosure is not limited to those examples.

In some embodiments, referring back to FIG. 2, the cache device 200 may further include a fifth apparatus 25 configured to delete the results of health checkups on the back-end server when a difference between the time the results was last updated and the present time is greater than a first predetermined time period. After deleting the results of health checkups because they have not been updated for more than the first predetermined time period, i.e., they are outdated, the information related to the results of health checkups is updated to include that the cache device 200 does not have the results of health checkups. This measure can ensure a load-balancing device that inquires the information to perform health checkups on the back-end server to obtain new results.

For example, to ensure in each time interval that at least one load-balancing device performs health checkups on the back-end server, when the cache device 200 writes the results of health checkups into Redis, the cache device 200 also uses an "EXPIRE" instruction of Redis to set the first predetermined time period for the results represented by <key, value>. Thus, the results become invalid after the first predetermined time period. For example, the first predetermined time period equals to ten seconds. When writing the results of health checkups of a back-end server having an IP address 1.1.1.1, the cache device 200 also gives an instruction "EXPIRE 1.1.1.1 10" to Redis. In ten seconds, the results of health checkups of the back-end server having the IP address 1.1.1.1 are deleted from Redis. Other load-balancing device that inquires about the results of health checkups of the back-end server having the IP address 1.1.1.1 is then informed that no such results are available and is prompted to perform health checkups on the back-end server.

One of ordinary skill in the art would understand that the description given above is merely an example and that the present disclosure is not so limited.

Figure 4:
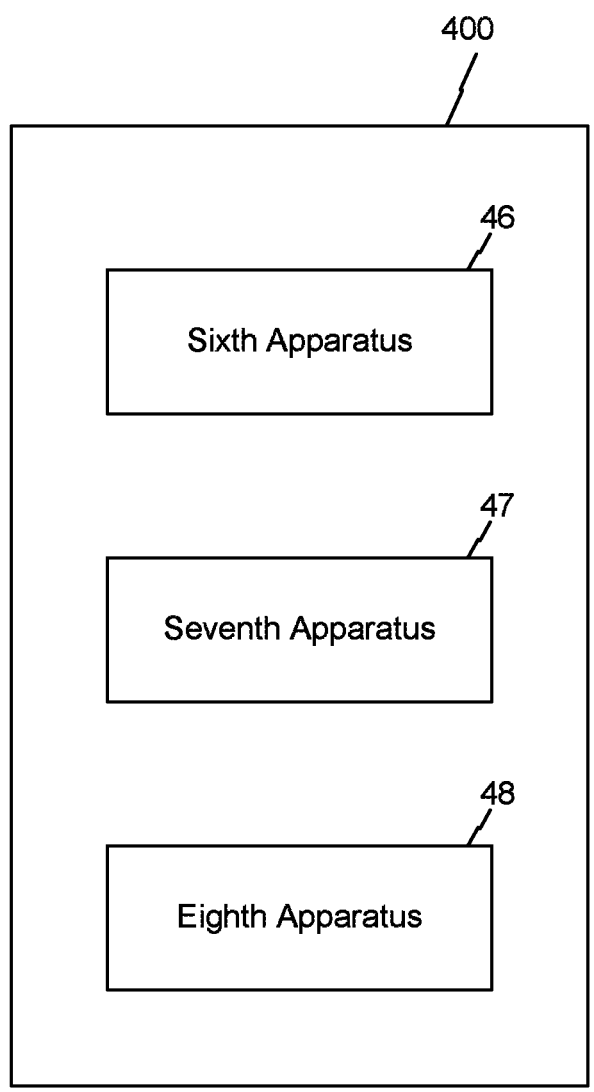
FIG. 4 is a block diagram showing an exemplary load-balancing device, consistent with embodiments of the present disclosure.

FIG. 4 is a block diagram showing an exemplary load-balancing device 400 consistent with embodiments of the present disclosure. Referring to FIG. 4, the load-balancing device 400 includes a sixth apparatus 46, a seventh apparatus 47, and an eighth apparatus 48.

The sixth apparatus 46 is configured to inquire a cache device about information of health checkups on a back-end server. The seventh apparatus 47 is configured to acquire information related to results of health checkups on the back-end server returned from the cache device. The eighth apparatus 48 is configured to process the information related to results of health checkups to obtain the results of health checkups.

In the illustrated embodiment, the load-balancing device 400 includes user devices, network devices, or the combination of user devices and network devices coupled to each other through network. The user devices include any electronic mobile device, such as a smart phone or a PDA that includes a human-machine interface, such as a touch panel that enables communication with users. The electronic mobile devices may include any operation system, such as android system or iOS system. The network devices may be an electronic device that can automatically perform computation and process messages and include one or more microprocessors, an application-specific integrated circuit (ASIC), a field-programmable gate array (FPGA), a digital signal processor (DSP), or other embedded elements. The network devices may include computers, network main machines, single network server, a cluster of network servers, or a cloud formed by multiple servers. In some embodiments, a cloud may be formed by a large number of computers and/or network servers for performing cloud computing. Clouding computing may be a kind of distributed computation and a virtue super computer composed of a set of loosely-coupled computers. The network includes internet, wide area network, metropolitan area network, local area network, VPN network, or ad hoc wireless network, etc. In some embodiments, the load-balancing device 400 may include scripts performed on the user devices, network devices, a combination of the user devices and network devices, touch terminals or a cluster including touch terminals and network devices coupled to each other through network. One of ordinary skill in the art would understand that the load-balancing device 400 explained above is merely examples. Other existing or future devices may be utilized as the load-balancing device 400 if they are consistent with embodiments of the present disclosure.

In some embodiments, the devices described above are set to continuously work with each other. One of ordinary skill in the art would understand that "continuously" means that each of devices may work in a real time mode or accordingly to a pre-determined mode or adjust its work mode in real time. For example, the sixth apparatus 46 may continuously inquire the cache device about information of health checkups on the back-end server. The seventh apparatus 47 may continuously acquire information related to results of health checkups on the back-end server returned from the cache device. The eighth apparatus 48 may continuously process the information related to results of health checkups to obtain the results of health checkups until the load-balancing device 400 ceases to work.

As explained above, the sixth apparatus 46 is configured to inquire the cache device about information of health checkups on the back-end server.

In some embodiments, a system can include one or more of load-balancing devices. Each of the load-balancing devices may independently inquire the cache device.

For example, the load-balancing devices consistent with embodiments of the present disclosure may include an LVS (Linux Virtue Server) that supports four layers of load balance, a Nginx that supports seven layers of load balance, or a HAProxy that simultaneously supports four or seven layers of load balance. One of ordinary skill in the art would understand that the above listed load-balancing devices are merely examples. The present disclosure is not so limited by these examples.

The seventh apparatus 47 is configured to acquire information related to results of health checkups on the back-end server from the cache device.

In the illustrated embodiment, the information related to results of health checkups may include the results of the health checkups, whether the back-end server is being checked, and whether or not results of health checkups exist.

The eighth apparatus 48 is configured to process the information related to results of health checkups to obtain the results of health checkups.

Figure 5A:
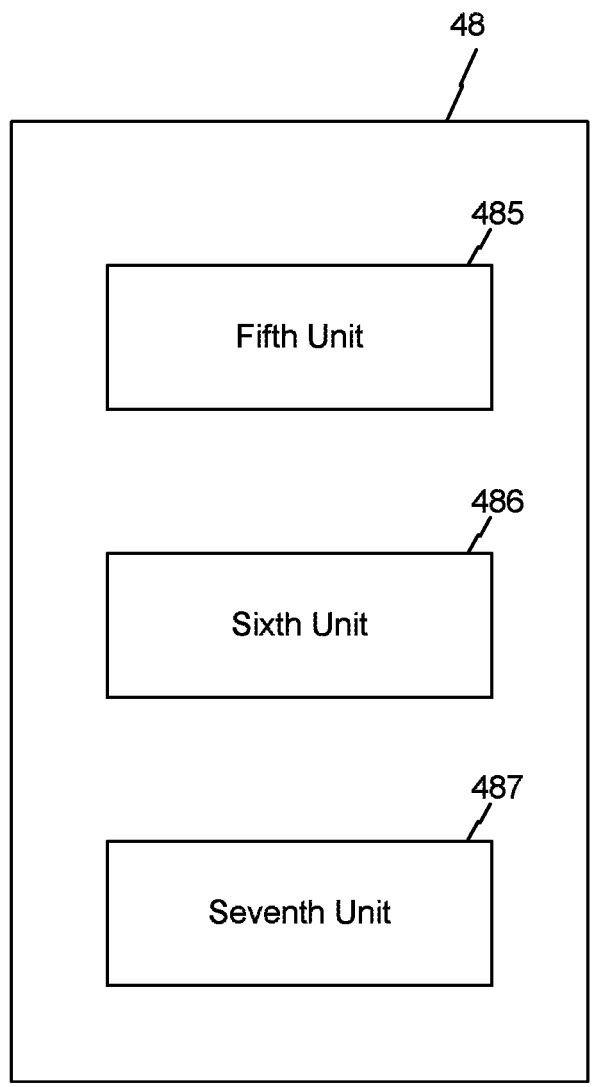
FIG. 5A is a block diagram showing an exemplary eighth apparatus 48 shown in FIG. 4, consistent with embodiments of the present disclosure.

FIG. 5A is a block diagram showing an exemplary eighth apparatus 48 consistent with embodiments of the present disclosure. The eighth apparatus 48 includes a fifth unit 485, a sixth unit 486, and a seventh unit 487. The fifth unit 485 is configured to instruct the sixth, seventh, and eighth apparatuses to again perform their respective functions after a lapse of a second predetermined time period if the information related to the results of health checkups indicates that the back-end server is being checked. The sixth unit 486 is configured to acquire results of health checkups when the information related to the results of health checkups includes the results of health checkups. The seventh unit 487 is configured to perform health checkups on the back-end server when the information related to the results of health checkups indicates that cache device does not have results of health checkups on the back-end server.

The second predetermined time period is not particularly limited and may be set by a user.

For example, the load-balancing device 400 uses the sixth apparatus to inquire the cache device about the information related to the results of health checkups. Meanwhile, another load-balancing device is performing health checkups on the back-end server. The eighth apparatus 48 processes the information related to the results of health checkups acquired by the seventh apparatus 47 and learns that the back-end server is being checked. The fifth unit 485 then postpones execution of the actions of the sixth, seventh, and eighth apparatuses until the lapse of the second predetermined time period. If the cache device has the results of health checkups on the back-end server, the eighth apparatus 48 processes the information related to the results of health checkups acquired by the seventh apparatus 47, and the sixth unit 486 directly acquires the result of health checkups. If the cache device does not have the results of health checkups on the back-end server and no other load-balancing device is performing health checkups on the back-end server, the seventh unit 487 then performs health checkups on the back-end server.

Figure 5B:
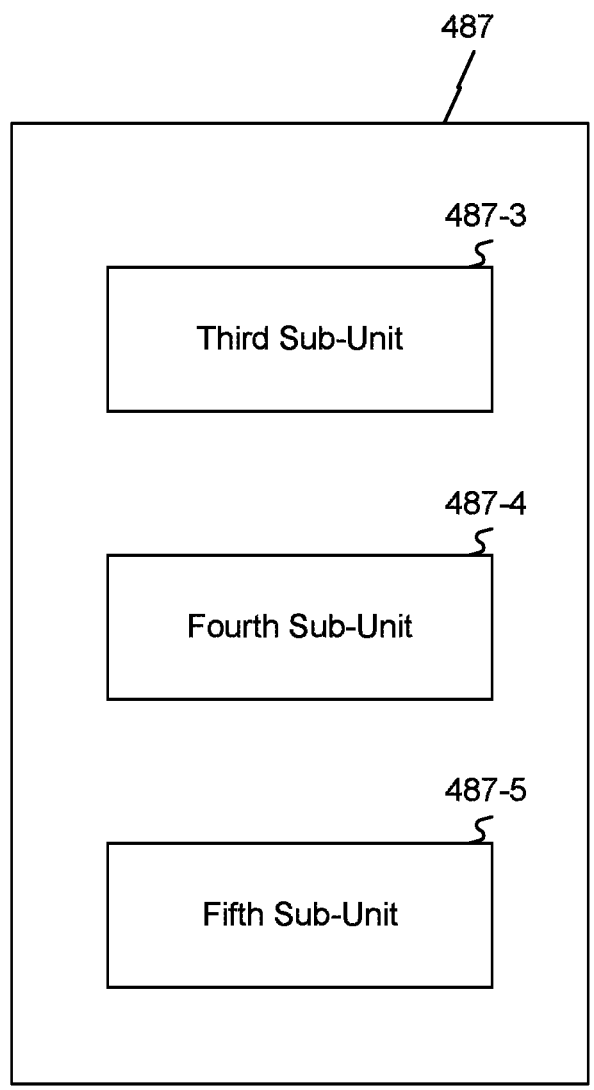
FIG. 5B is a block diagram showing an exemplary seventh unit 487 shown in FIG. 5A, consistent with embodiments of the present disclosure.

FIG. 5B is a block diagram showing an exemplary seventh unit 487 consistent with embodiments of the present disclosure. The seventh unit 487 includes a third sub-unit 487-3 and a fourth sub-unit 487-4. The third sub-unit 487-3 is configured to inform the cache device that the back-end server is being checked when the third sub-unit 487-3 is performing health checkups on the back-end server. The fourth sub-unit 487-4 is configured to inform the cache device that the health checkups on the back-end server are concluded after the third sub-unit 487-3 completes the health checkups on the back-end server.

For example, the load-balancing device 400 uses the sixth apparatus 46 to forward an inquiry about information related to the health checkups on the back-end server to cache device. The eighth apparatus 48 processes the information related to the results of health checkups acquired by the seventh apparatus 47. The information indicates that the cache device does not have results of health checkups on the back-end server and that no other load-balancing device is performing health checkups on the back-end server. The load-balancing device 400 then uses the seventh unit 487 to perform health checkups on the back-end server. The third sub-unit 487-3 informs the cache device that the back-end server is being checked when the third sub-unit 487-3 starts to perform health checkups on the back-end server. Therefore, when another load-balancing device inquires the cache device about the information related to results of health checkups on the back-end server, the cache device can inform that other load-balancing device that it does not have the information and that the back-end server is being checked at the time. The fourth sub-unit 487-4 is configured to inform the cache device that the health checkups on the back-end server are concluded after the load-balancing device 400 completes the health checkups on the back-end server. When another load-balancing device again inquires the cache device about the information related to results of health checkups on the back-end server, the cache device can inform that other load-balancing device of the results or no results of the health checkups available, and that no other load-balancing device is performing health checkups on the back-end server.

In some embodiments, the seventh unit 487 further includes a fifth sub-unit 487-5 configured to forward the results of health checkups on the back-end server to the cache device after the health checkups on the back-end server are concluded so that the cache device may update the information related to the results of health checkups.

In the illustrated embodiment, the fifth sub-unit 487-5 forwards the results of health checkups on the back-end server to the cache device. The cache device can use the results to update the information related to the results of health checkups on the back-end server. In one embodiment, the cache device can make no update when it receives the results of health checkups for the first time and update the information related to the results of health checkups on the back-end server when it receives the results for the second time.

Figure 6:
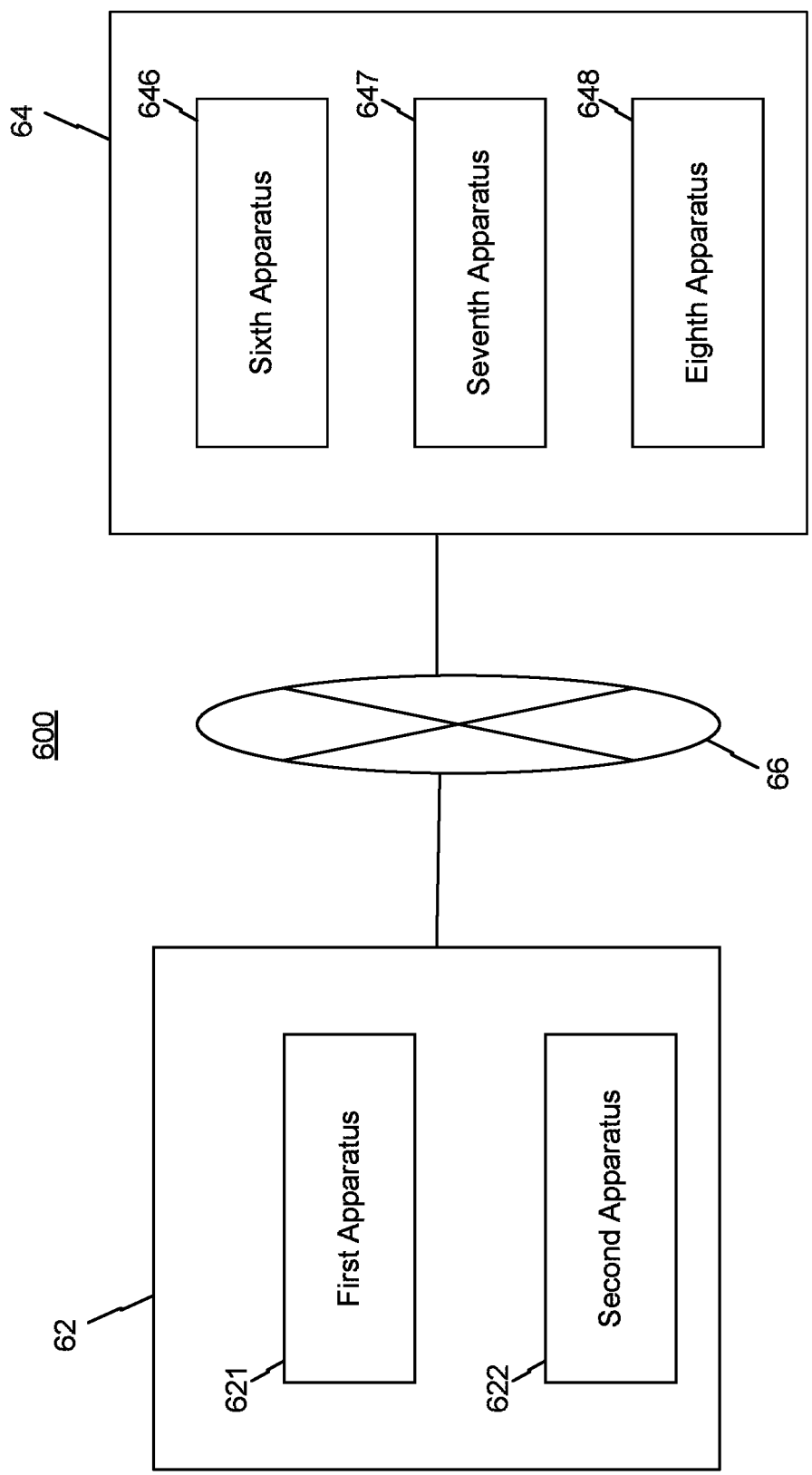
FIG. 6 is a block diagram showing a system for monitoring the health of one or more back-end servers, consistent with embodiments of the present disclosure.

FIG. 6 is a block diagram showing a system 600 for monitoring the health of one or more back-end servers. Referring to FIG. 6, system 600 includes a cache device 62, a load-balancing device 64, and a network 66 that couples the cache device 62 and the load-balancing device 64. The cache device 62 includes a first apparatus 621 and a second apparatus 622. The load-balancing device 64 includes a sixth apparatus 646, a seventh apparatus 647, and an eighth apparatus 648. The sixth apparatus 646 of load-balancing device 64 is configured to inquire the cache device 62 about information of health checkups on a back-end server. The first apparatus 621 of the cache device 62 is configured to acquire information related to results of health checkups on the back-end server based on the inquiry from a load-balancing device about the results of health checkups on the back-end server. The second apparatus 622 of the cache device 62 is configured to transmit the information related to results of the health checkups to the load-balancing device 64. The seventh apparatus 647 of the load-balancing device 64 is configured to acquire information related to results of health checkups on the back-end server returned from the cache device 62. The eighth apparatus 648 is configured to process the information related to results of health checkups to obtain the results of health checkups. In the illustrated embodiment, the first apparatus 621 and the second apparatus 622 of the cache device 62 are the same or substantially the same as the first apparatus 11 and the second apparatus 12 of the cache device 100 shown in FIG. 1. The sixth apparatus 646, the seventh apparatus 647, and the eighth apparatus 648 of the load-balancing device 64 are the same or substantially the same as the sixth apparatus 46, the seventh apparatus 47, and the eighth apparatus 48 of the load-balancing device 400 shown in FIG. 4. The functions and actions performed by these apparatuses are thus omitted for brevity.

Figure 7:
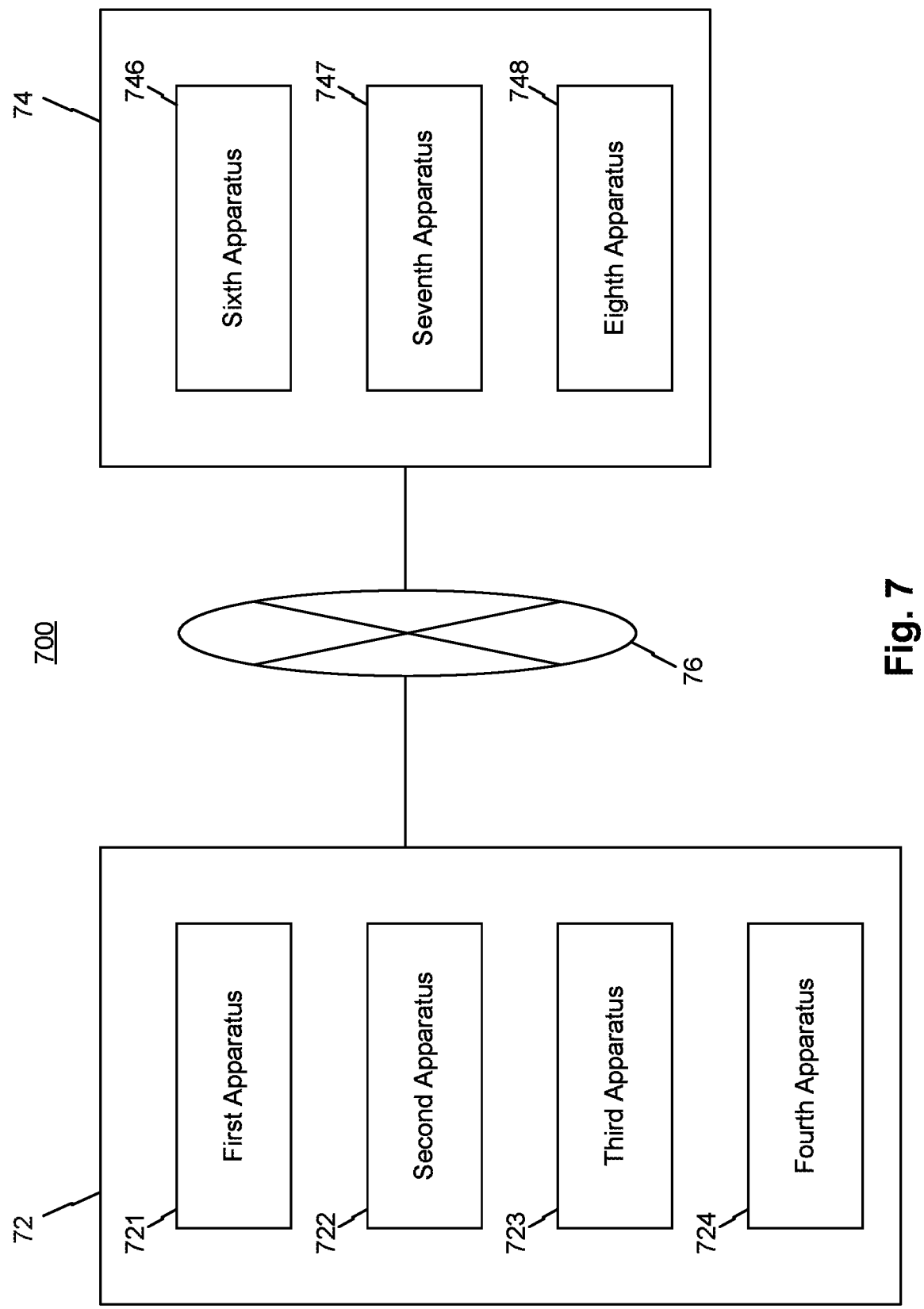
FIG. 7 is a block diagram showing another system for monitoring the health of one or more back-end servers, consistent with embodiments of the present disclosure.

FIG. 7 is a block diagram showing a system 700 for monitoring the health of one or more back-end servers. Referring to FIG. 7, system 700 includes a cache device 72, a load-balancing device 74, and a network 76 that couples the cache device 72 and the load-balancing device 74. The cache device 72 includes a first apparatus 721, a second apparatus 722, a third apparatus 723, and a fourth apparatus 724. The load-balancing device 74 includes a sixth apparatus 746, a seventh apparatus 747, and an eighth apparatus 748. The sixth apparatus 746 of load-balancing device 74 is configured to inquire the cache device 72 about information of health checkups on a back-end server. The first apparatus 721 of the cache device is configured to acquire information related to results of health checkups on the back-end server based on the inquiry from a load-balancing device about the results of health checkups on the back-end server. The second apparatus 722 of the cache device 72 is configured to transmit the information related to results of the health checkups to the load-balancing device 74. The seventh apparatus 747 of the load-balancing device 74 is configured to acquire information related to results of health checkups on the back-end server returned from the cache device 72. The eighth apparatus 748 is configured to process the information related to results of health checkups to obtain the results of health checkups. The third apparatus 723 is configured to update the information related to the results of health checkups on the back-end server, based on the results of health checkups on the back-end server provided by the load-balancing device 74. The fourth apparatus 24 is configured to update the information related to the results of health checkups on the back-end server to include that the load-balancing device 74 is performing health checkups on the back-end server or that the load-balancing device 74 completes health checkups on the back-end server. In the illustrated embodiment, the first apparatus 721, the second apparatus 722, the third apparatus 723, and the fourth apparatus 724 of the cache device 72 are the same or substantially the same as the first apparatus 21, the second apparatus 22, the third apparatus 23, and the fourth apparatus 24 of the cache device 200, respectively, shown in FIG. 2. The sixth apparatus 746, the seventh apparatus 747, and the eighth apparatus 748 of the load-balancing device 74 are the same or substantially the same as the sixth apparatus 46, the seventh apparatus 47, and the eighth apparatus 48 of the load-balancing device 400, respectively, shown in FIG. 4. The functions and actions performed by these apparatuses are thus omitted for brevity.

Figure 8:
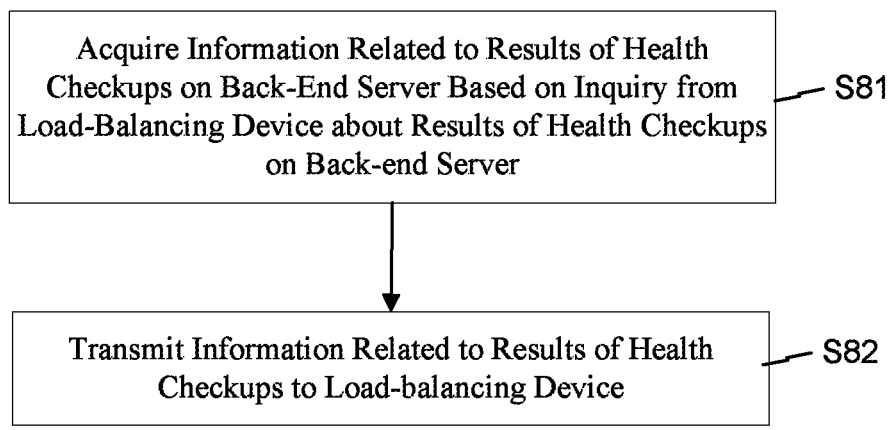
FIG. 8 is a flow chart showing a method for monitoring the health of a back-end server, consistent with embodiments of the present disclosure.

FIG. 8 is a flow chart showing a method 800 for monitoring the health of a back-end server. Method 800 may be performed by a cache device, such as cache devices 100 and 200 shown in FIGS. 1 and 2.

The method 800 includes steps S81 and S82. In step S81, the cache device acquires information related to results of health checkups on a back-end server based on an inquiry from a load-balancing device about the results of health checkups on the back-end server. In step S82, the cache device transmits the information related to results of the health checkups to the load-balancing device.

In the illustrated embodiment, the cache device includes user devices, network devices, or the combination of user devices and network devices coupled to each other through network. The user devices include any electronic mobile device, such as a smart phone or a PDA that includes a human-machine interface, such as a touch panel that enables communication with users. The electronic mobile devices may include any operation system, such as android system or iOS system. The network devices may be an electronic device that can automatically perform computation and process messages and include one or more microprocessors, an application-specific integrated circuit (ASIC), a field-programmable gate array (FPGA), a digital signal processor (DSP), or other embedded elements. The network devices may include computers, network main machines, single network server, a cluster of network servers, or a cloud formed by multiple servers. In some embodiments, a cloud may be formed by a large number of computers and/or network servers for performing cloud computing. Clouding computing may be a kind of distributed computation and a virtue super computer composed of a set of loosely-coupled computers. The network includes internet, wide area network, metropolitan area network, local area network, VPN network, or ad hoc wireless network, etc. In some embodiments, the cache device may include scripts performed on the user devices, network devices, a combination of the user devices and network devices, touch terminals or a cluster including touch terminals and network devices coupled to each other through network. One of ordinary skill in the art would understand that the cache device explained above is merely examples. Other existing or future devices may be utilized as the cache device if they are consistent with embodiments of the present disclosure.

In some embodiments, the steps performed by the cache device continuously work with each other. For example, in step S81, the cache device may continuously acquire information related to results of health checkups on a back-end server based on an inquiry from a load-balancing device about the results of health checkups on the back-end server. In step S82, the cache device may continuously transmit the information related to results of the health checkups to one or more of load-balancing devices until the cache device ceases to work.

As explained above, in step S81, the cache device acquires information related to results of health checkups on a back-end server based on an inquiry from a load-balancing device about the results of health checkups on the back-end server. The information related to results of health checkups may include the results of the health checkups, whether the back-end server is being checked, and whether or not results of health checkups exist.

In the illustrated embodiment, whether the back-end server is being checked means that there is information indicating another load-balancing device is performing health checkups on the back-end server. Whether or not results of health checkups exist means that there are existing health checkup results stored in the cache device, or that there are no health checkup results stored in the cache device and no other load-balancing device is performing health checkup on the back-end server.

In step S82, the cache device transmits the information related to results of the health checkups to one or more of the load-balancing devices.

For example, in step S81, the cache device is inquired by a first load-balancing device about the results of health checkups on a back-end server. Based on the inquiry, the cache device acquires information related to results of the health checkups from a second load-balancing device, which indicates that the second load-balancing device is performing health checkups on the back-end server. In step S82, based on this information, the cache device informs the first load-balancing device that the back-end server is receiving health checkups. If the cache device has stored the results of health checkups on the back-end server, in step S82, it returns the results to the first load-balancing device that inquires such information. If the cache device does not store therein results of health checkups on the back-end server and no other load-balancing device is performing health checkups on the back-end server, in step S82, the cache device informs the first load-balancing device that no results are available.

Figure 9:
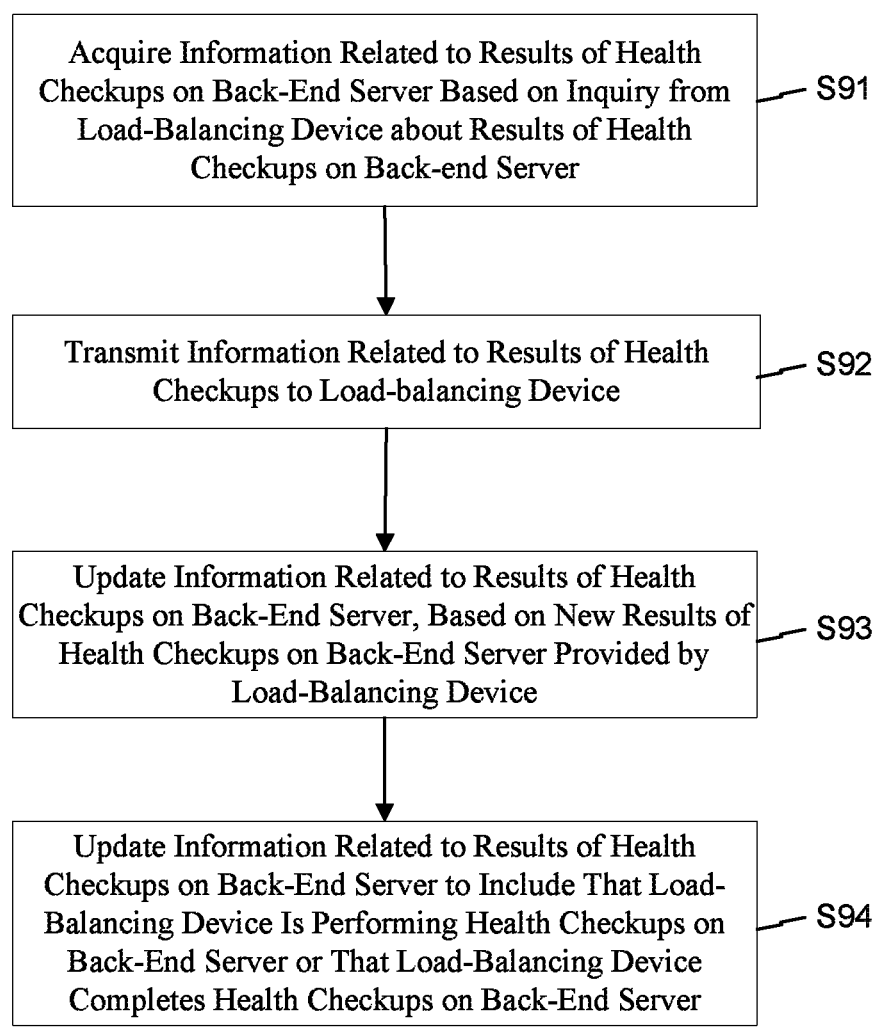
FIG. 9 is a flow chart showing another method for monitoring the health of a back-end server, consistent with embodiments of the present disclosure.

FIG. 9 is a flow chart showing a method 900 for monitoring the health of a back-end server. Method 900 may be performed by a cache device, such as the cache device 200 shown in FIG. 2.

The method 900 includes steps S91, S92, S93, and S94. Steps S91 and S92 of method 900 are the same or substantially the same as steps S81 and S82 of method 800 shown in FIG. 8. The details of steps S91 and S92 are thus omitted for brevity.

In step S93, the cache device updates the information related to the results of health checkups on the back-end server, based on new results of health checkups on the back-end server provided by a load-balancing device. In step S94, the cache device updates the information related to the results of health checkups on the back-end server to include that the load-balancing device is performing health checkups on the back-end server or that the load-balancing device completes health checkups on the back-end server.

In one embodiment, in step S91, the cache device acquires information related to results of health checkups on the back-end server based on an inquiry from a third load-balancing device. The inquiry is about the results of health checkups on the back-end server. In step S92, the cache device informs the third load-balancing device that there are no results of health checkups on the back-end server. The third load-balancing device thus begins to perform health checkups on the back-end server. In step S94, the cache device updates the information related to results of health checkups on the back-end server based on information indicating that the third load-balancing device is performing health checkups on the back-end server. The updated information related to results of health checkups includes that there are no results of health checkups available and that the back-end server is being checked. When the third load-balancing device completes the health checkups on the back-end server, in step S93, the cache device updates the information related to results of health checkups on the back-end server based on the results of the health checkups that the third load-balancing device provides. The updated information related to results of health checkups includes that there are available results of health checkups and that no load-balancing device is performing health checkups on the back-end server. In step S94, the cache device updates the information related to results of health checkups on the back-end server based on that the third load-balancing device completes the health checkups on the back-end server.

In some embodiments, in step S93, the cache device forwards the updated information of health checkups to a distributed cache memory device.

For example, the distributed cache memory device may use Redis, which is open source software for caching or storing a plurality of key-value data. For example, the results of health checkups can be saved as <key, value> pair, where the key represents a back-end server and the value represents the results of health checkups. For example, value=1 and value=0 mean the back-end server is in normal and abnormal states, respectively. The cache device may use "SET" instruction to enter the results of health checkups into Redis data structure. If the results show that a back-end server having an IP address at 1.1.1.1 is in a normal state, the cache device sends a "SET 1.1.1.1 1" instruction to Redis. When the first apparatus 21 is inquired about the results of health checkups, the cache device uses a "GET" instruction of Redis to retrieve the related information. For example, if the inquiry is about the results of health checkups of a back-end server having an IP address at 1.1.1.1, the cache device sends a "GET 1.1.1.1" instruction to Redis. If a response to the "GET 1.1.1.1" instruction is blank, it means that the cache device does not store results of health checkups. One of ordinary skill in the art would understand that the above-described distributed cache system and methods of reading from and writing into the cache device are exemplary. Other methods of reading from and writing into the cache device and other storage systems, whether they are currently available or will be available, are within the scope of this disclosure if they are able to be used in the cache device.

In one embodiment, in step S93, the cache device directly updates the information related to results of health checkups based on results of health checkups provided by a load-balancing device.

For example, when the cache device receives the results of health checkups on the back-end server provided by the load-balancing device, it can directly update the information related to results of health checkups, which can quickly provide updated information for use and reduce time required to update.

In some embodiments, in step S93, when the cache device receives the results of health checkups for the first time, it skips updating the information related to results of health checkups on the back-end server. Also in step S93, when the cache device receives the results of health checkups for the second time, it then updates the information related to results of health checkups on the back-end server.

In some embodiments, in step S93, the cache device may request the distributed cache memory device to write a main try key therein. The main try key is indicative of a first try to write information related to results of health checkups, and is effective during a predetermined third time period. Also in step S93, the cache device may request the distributed cache memory device to delete the main try key.

The main try key is effective during the predetermined third time period. When it is outside of the predetermined third time period, the main try key is automatically deleted to avoid machine failure that may cause the system to operate abnormally. If the distributed cache memory device receives a request from the cache device to delete the main try key within the predetermined third time period, the main try key is deleted. This is because the cache device has completes updating the information related to results of health checkups.

The predetermined third time period is not particularly limited and can be set by a user.

In one embodiment, a system includes three load-balancing devices A, B, and C. They are activated to operate in one second from each other. Each of load-balancing devices A, B, and C conducts a health checkup on a back-end server every ten seconds. In one period of ten seconds, a first load-balancing device A makes an inquiry to a cache device about the information related to results of health checkups on the back-end server. In step S92, the cache device returns a response indicating that the cache device does not have results of health checkups on the back-end server. The response causes the first load-balancing device A to perform health checkups on the back-end server. When first load-balancing device A completes the health checkups and tries to write the results of the health checkups into the cache device, in step S93, the cache device does not update the information related to results of health checkups because this is the first time the cache device receives the results. That is, the cache device does not write the results of the health checkups into Redis. Instead, the cache device sends an instruction to Redis asking Redis to enter a main try key k-try to note that there is a first attempt to write results health checkups on the back-end server. If the main try key k-try exists for more than the third predetermined time period, Redis automatically deletes the main try key k-try. Meanwhile, a second load-balancing device B inquires about the results of health checkups. Because the results from the first load-balancing device A was not written into Redis, in step S92, the cache device still returns a message to the second load-balancing device B indicating that the cache device does not have information related to results of health checkups on the back-end server. The message causes the second load-balancing device B to perform health checkups on the back-end server. The cache device updates the information related to results of health checkups and deletes the main try key k-try. The cache device forwards the results of the health checkups from the second load-balancing device B to Redis to be saved therein. Subsequently, a third load-balancing device C or other load-balancing device inquires the cache device about the results of the health checkups on the back-end server. In step S92, the cache device returns the information related to the results of the health checkups on the back-end server to the inquiring load-balancing device. The third load-balancing device C thus does not need to perform health checkups on the back-end server.

One of ordinary skill in the art would understand that the above-described number of load-balancing devices, the times those load-balancing devices are activated to work, or the time period or frequency the load-balancing devices conducts health checkups on the back-end server are merely exemplary and can be modified. The present disclosure is not limited to those examples.

In some embodiments, the method 900 may further include a step S95. In step S95, the cache device deletes the results of health checkups on the back-end server when a difference between the time the results was last updated and the present time is greater than a first predetermined time period.

The first predetermined time period is not particularly limited and can be set by a user. After deleting the results of health checkups because they have not been updated for more than the first predetermined time period, the information related to the results of health checkups is updated to include that the cache device does not have the results of health checkups. This measure causes a load-balancing device that later inquires the information to perform health checkups on the back-end server to obtain new results.

For example, to ensure in each time interval that at least one load-balancing device performs health checkups on the back-end server, when the cache device writes the results of health checkups into Redis, the cache device also uses an "EXPIRE" instruction of Redis to set the first predetermined time period for the results represented by <key, value>. Thus, the results become invalid after the first predetermined time period. For example, the first predetermined time period equals to ten seconds. When writing the results of health checkups of a back-end server having an IP address 1.1.1.1, the cache device also gives an instruction "EXPIRE 1.1.1.1 10" to Redis. In ten seconds, the results of health checkups of the back-end server having the IP address 1.1.1.1 are deleted from Redis. Other load-balancing device that inquires about the results of health checkups of the back-end server having the IP address 1.1.1.1 is then informed that no such results are available and is prompted to perform health checkups on the back-end server.

One of ordinary skill in the art would understand that the descriptions given above are merely an example and that the present disclosure is not so limited.

Figure 10:
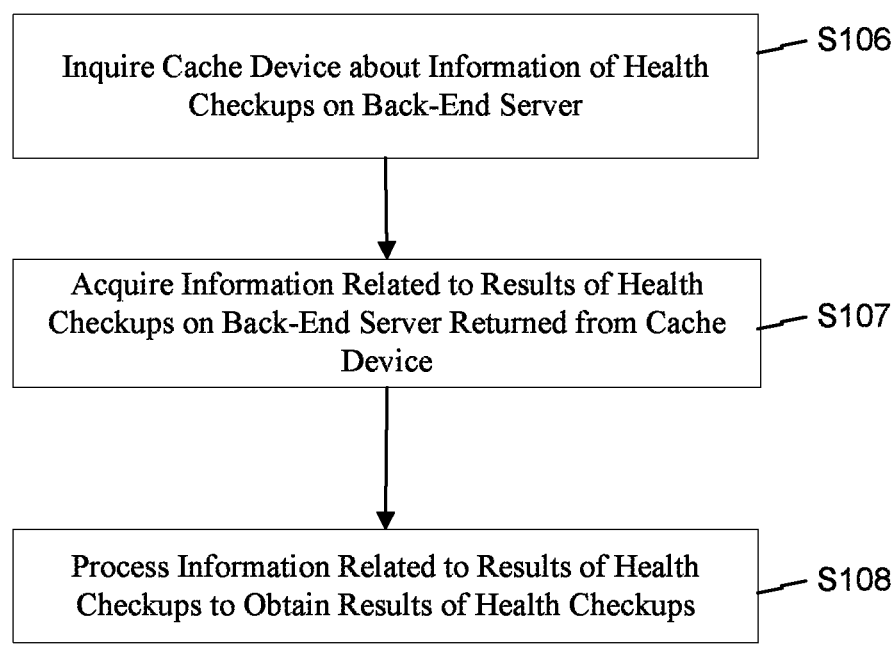
FIG. 10 is a flow chart showing yet another method for monitoring the health of a back-end server, consistent with embodiments of the present disclosure.

FIG. 10 is a flow chart showing an exemplary method 1000 for monitoring the health of one or more back-end servers consistent with embodiments of the present disclosure. Method 1000 may be performed by a load-balancing device, such as the load-balancing device 400 shown in FIG. 4.

Referring to FIG. 10, the method 1000 includes steps S106, S107, and S108. In step S106, the load-balancing device inquires a cache device about information of health checkups on a back-end server. In step S107, the load-balancing device acquires information related to results of health checkups on the back-end server returned from the cache device. In step S108, the load-balancing device processes the information related to results of health checkups to obtain the results of health checkups.

In the illustrated embodiment, the load-balancing device includes user devices, network devices, or the combination of user devices and network devices coupled to each other through network. The user devices include any electronic mobile device, such as a smart phone or a PDA that includes a human-machine interface, such as a touch panel that enables communication with users. The electronic mobile devices may include any operation system, such as android system or iOS system. The network devices may be an electronic device that can automatically perform computation and process messages and include one or more microprocessors, an application-specific integrated circuit (ASIC), a field-programmable gate array (FPGA), a digital signal processor (DSP), or other embedded elements. The network devices may include computers, network main machines, single network server, a cluster of network servers, or a cloud formed by multiple servers. In some embodiments, a cloud may be formed by a large number of computers and/or network servers for performing cloud computing. Clouding computing may be a kind of distributed computation and a virtue super computer composed of a set of loosely-coupled computers. The network includes internet, wide area network, metropolitan area network, local area network, VPN network, or ad hoc wireless network, etc. In some embodiments, the load-balancing device may include scripts performed on the user devices, network devices, a combination of the user devices and network devices, touch terminals or a cluster including touch terminals and network devices coupled to each other through network. One of ordinary skill in the art would understand that the load-balancing device explained above is merely examples. Other existing or future devices may be utilized as the load-balancing device if they are consistent with embodiments of the present disclosure.

In some embodiments, the steps performed by the load-balancing device continuously work with each other. For example, in step S106, the load-balancing device may continuously inquire the cache device about information of health checkups on the back-end server. In step S107, the load-balancing device may continuously acquire information related to results of health checkups on the back-end server returned from the cache device. In step S108, the load-balancing device may continuously process the information related to results of health checkups to obtain the results of health checkups until the load-balancing device ceases to work.

As explained above, in step S106, the load-balancing device inquires the cache device about information of health checkups on the back-end server.

In some embodiments, a system can include one or more of load-balancing devices. Each of the load-balancing devices may independently inquire the cache device.

For example, the load-balancing devices consistent with embodiments of the present disclosure may include an LVS (Linux Virtue Server) that supports four layers of load balance, a Nginx that supports seven layers of load balance, or a HAProxy that simultaneously supports four or seven layers of load balance. One of ordinary skill in the art would understand that the above listed load-balancing devices are merely examples. The present disclosure is not so limited by these examples.

In step S107, the load-balancing device acquires information related to results of health checkups on the back-end server returned from the cache device.

In the illustrated embodiment, the information related to results of health checkups may include the results of the health checkups, whether the back-end server is being checked, and whether or not results of health checkups exist.

In step S108, the load-balancing device processes the information related to results of health checkups to obtain the results of health checkups.

In one embodiment, in step S108, if the information related to the results of health checkups indicates that the back-end server is being checked, the load-balancing device again executes the steps S106, S107, and S108 after a lapse of a second predetermined time period. If the information related to the results of health checkups includes the results of health checkups, the load-balancing device directly acquires the results of health checkups. If the information related to the results of health checkups indicates that cache device does not have results of health checkups on the back-end server, the load-balancing device performs health checkups on the back-end server.

The second predetermined time period is not particularly limited and may be set by a user.

For example, in step S106, the load-balancing device inquires the cache device about the information related to the results of health checkups. Meanwhile, another load-balancing device is performing health checkups on the back-end server. In step S108, the load-balancing device processes the information related to the results of health checkups acquired by load-balancing device in step S107 and learns that the back-end server is being checked. The load-balancing device then postpones execution of the steps S106, S107, and S108 until the lapse of the second predetermined time period. If the cache device has the results of health checkups on the back-end server, in step S108, the load-balancing device processes the information related to the results of health checkups acquired by the load-balancing device in step S107, and directly acquires the results of health checkups. If the cache device does not have the results of health checkups on the back-end server and no other load-balancing device is performing health checkups on the back-end server, in step S108, the load-balancing device processes the information related to the results of health checkups acquired by the load-balancing device in step S107. Because the information indicates that the cache device does not have results of health checkups, the load-balancing device then performs health checkups on the back-end server.

In one embodiment, in step S108, the load-balancing device informs the cache device that the back-end server is being checked when the load-balancing device is performing health checkups on the back-end server. The load-balancing device further informs the cache device that the health checkups on the back-end server are concluded after the load-balancing device completes the health checkups on the back-end server.

For example, in step S106, the load-balancing device forwards an inquiry about information related to the health checkups on the back-end server to the cache device. In step S108, the load-balancing device then processes the information related to the results of health checkups acquired by the load-balancing device in step S107. The information indicates that the cache device does not have results of health checkups on the back-end server and that no other load-balancing device is performing health checkups on the back-end server. The load-balancing device performs health checkups on the back-end server. The load-balancing device informs the cache device that the back-end server is being checked when the load-balancing device starts to perform health checkups on the back-end server. Therefore, when another load-balancing device inquires the cache device about the information related to results of health checkups on the back-end server, the cache device can inform that other load-balancing device that it does not have the information and that the back-end server is being checked at the time. The load-balancing device informs the cache device that the health checkups on the back-end server are concluded after it completes the health checkups on the back-end server. When another load-balancing device again inquires the cache device about the information related to results of health checkups on the back-end server, the cache device can inform that other load-balancing device of the results or no results of the health checkups, and that no other load-balancing device is performing health checkups on the back-end server.

In some embodiments, in step S108, the load-balancing device forwards the results of health checkups on the back-end server to the cache device after the health checkups on the back-end server are concluded so that the cache device may update the information related to the results of health checkups.

In the illustrated embodiment, the load-balancing device forwards the results of health checkups on the back-end server to the cache device. The cache device can use the results to update the information related to the results of health checkups on the back-end server. In one embodiment, the cache device can skip updating the information when it receives the results of health checkups for the first time and update the information related to the results of health checkups on the back-end server when it receives the results for the second time.

Figure 11:
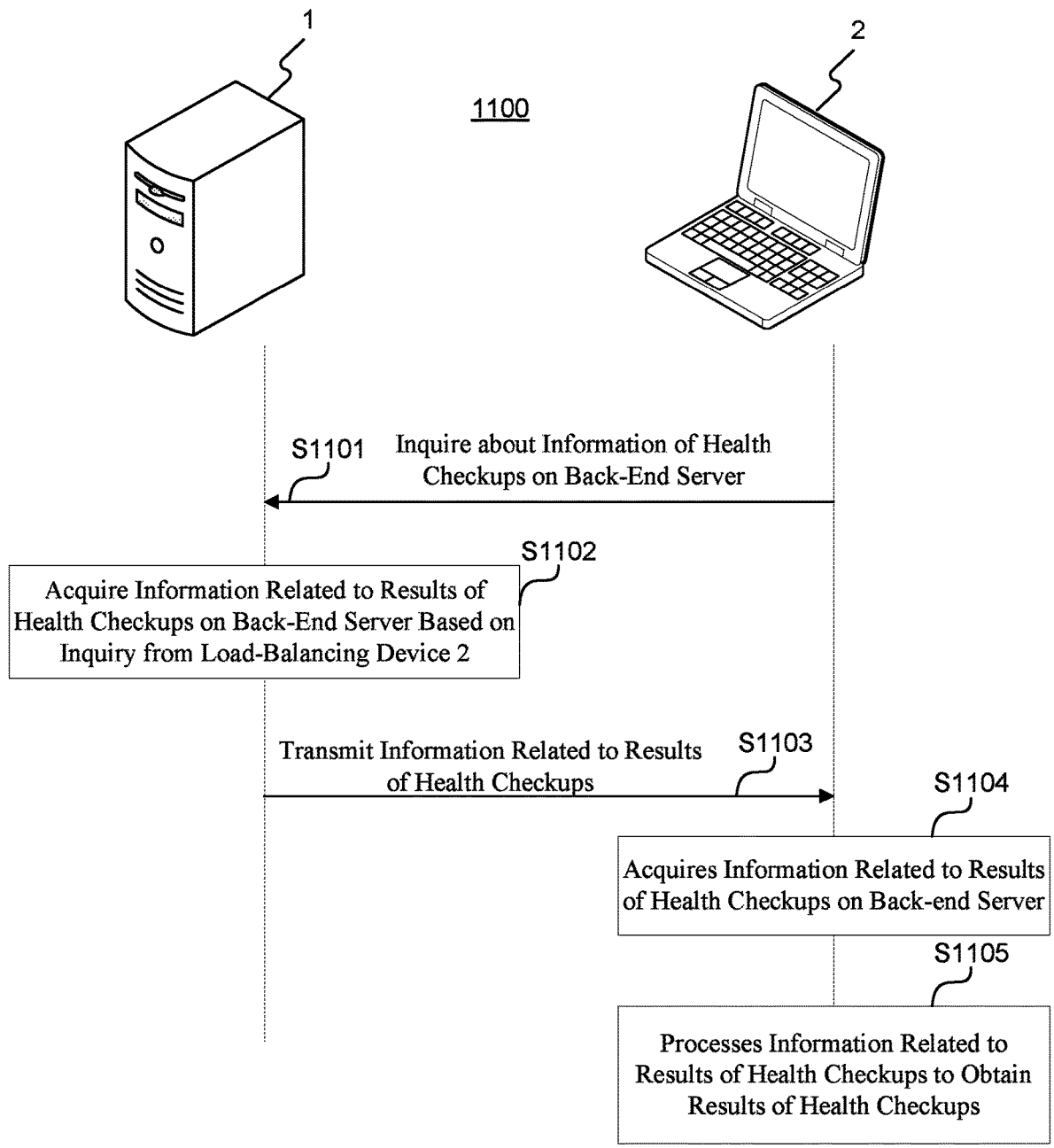
FIG. 11 is a flow chart showing yet another method for monitoring the health of a back-end server, consistent with embodiments of the present disclosure.

FIG. 11 is a flow chart showing a method 1100 for monitoring the health of one or more back-end servers. The method 1100 is performed by a system including a cache device 1 and a load-balancing device 2.

In step S1101, the load-balancing device 2 inquires the cache device 1 about information of health checkups on a back-end server. In step S1102, the cache device 1 acquires information related to results of health checkups on the back-end server based on the inquiry from the load-balancing device 2. In step S1103, the cache device 1 transmits the information related to results of the health checkups to the load-balancing device 2. In step S1104, the load-balancing device 2 acquires information related to results of health checkups on the back-end server returned from the cache device 1. In step S1105, the load-balancing device 2 processes the information related to results of health checkups to obtain the results of health checkups. In the illustrated embodiment, steps S1102 and S1103 are the same or substantially the same as the steps S81 and S82, respectively, shown in FIG. 8. The steps S1101, S1104, and S1105 are the same or substantially the same as the steps S106, S107, S108, respective, shown in FIG. 10. The details of the steps S1101-S1105 are thus omitted for brevity.

Figure 12:
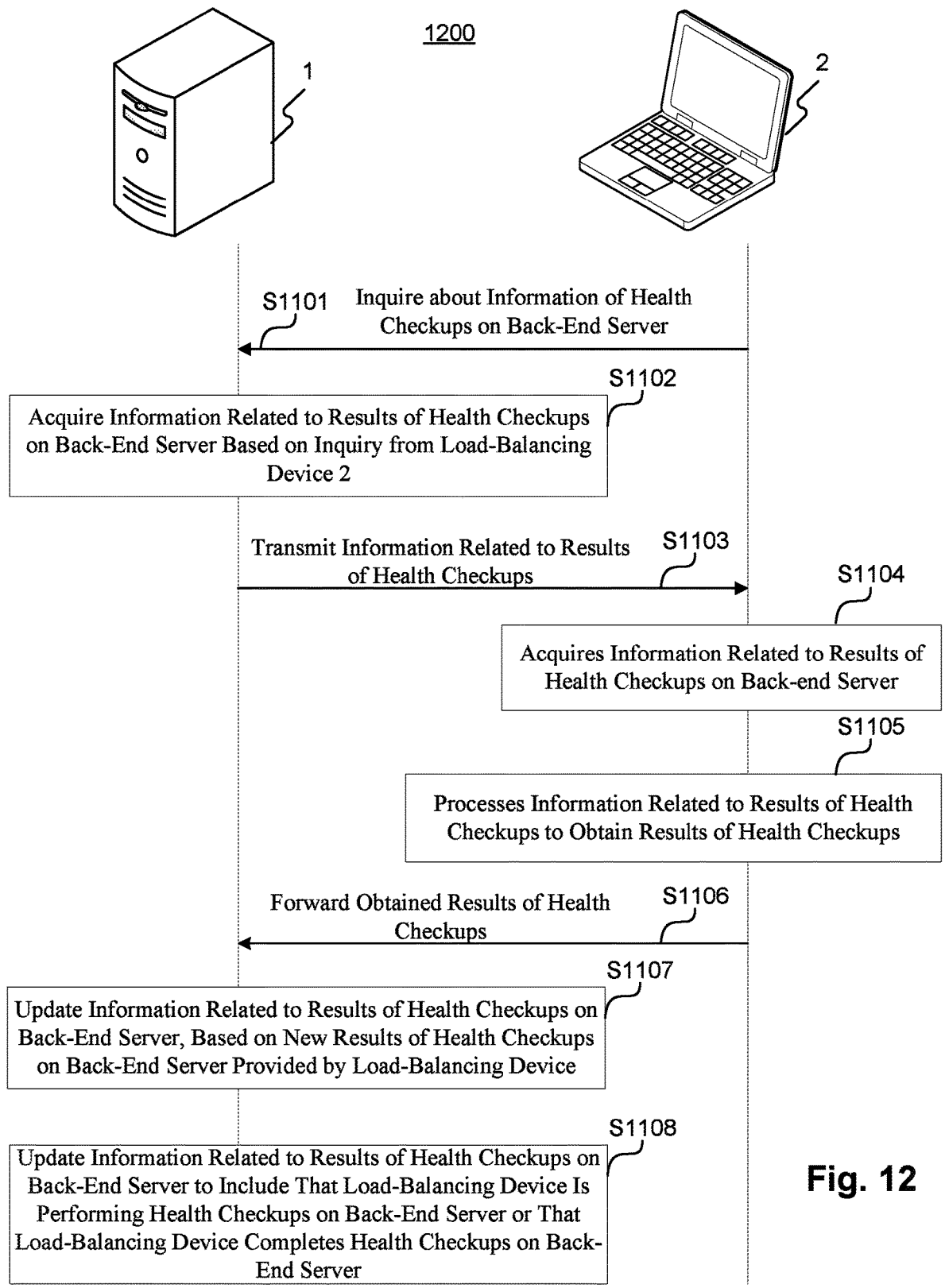
FIG. 12 is a flow chart showing yet another method for monitoring the health of a back-end server, consistent with embodiments of the present disclosure.

FIG. 12 is a flow chart showing a method 1200 for monitoring the health of one or more back-end servers. The method 1200 is performed by a system including a cache device 1 and a load-balancing device 2.

In step S1201, the load-balancing device 2 inquires the cache device 1 about information of health checkups on a back-end server. In step S1202, the cache device 1 acquires information related to results of health checkups on the back-end server based on the inquiry from the load-balancing device 2. In step S1203, the cache device 1 transmits the information related to results of the health checkups to the load-balancing device 2. In step S1204, the load-balancing device 2 acquires information related to results of health checkups on the back-end server returned from the cache device 1. In step S1205, the load-balancing device 2 processes the information related to results of health checkups to obtain the results of health checkups. In step S1206, the load-balancing device 2 forwards the obtained results of health checkups to the cache device 1.

In step S1207, the cache device 1 updates the information related to the results of health checkups on the back-end server, based on the results of health checkups on the back-end server provided by the load-balancing device 2. In step S1208, the cache device 1 updates the information related to the results of health checkups on the back-end server to include that the load-balancing device 1 is performing health checkups on the back-end server or that the load-balancing device 2 completes health checkups on the back-end server. In the illustrated embodiment, steps S1202, S1203, S1207, and S1208 are the same or substantially the same as the steps S91, S92, S93, and S94, respectively, shown in FIG. 9. The steps S1201, S1204, and S1205 are the same or substantially the same as the steps S106, S107, and S108, respective, shown in FIG. 10. The details of the steps S1201-S1208 are thus omitted for brevity.

Consistent with the embodiments of the present disclosure, a load-balancing device inquires a cache device about information related the results of health checkups on a back-end server before the load-balancing device performs health checkups on the back-end server, and acquires and processes the information related the results of health checkups on the back-end serve returned from the cache server. If the information related the results of health checkups includes the results of health checkups on the back-end serve, the load-balancing device directly acquires the result and does not need to perform health checkups on the back-end server itself. If the information related to results of health checkups on the back-end server indicates that the cache device does not have the results of health checkups on the back-end server and that another load-balancing device is performing health checkups on the back-end server, the load-balancing device waits until the lapse of a second predetermined time period to make an inquiry again. If the information related to results of health checkups on the back-end server indicates that the cache device does not have the results of health checkups on the back-end server and that no other load-balancing device is performing health checkups on the back-end server, the load-balancing device then performs health checkups on the back-end server. The caches device updates the information related to results of health checkups on the back-end server to include that the load-balancing device is performing or completing health checkups on the back-end server. The caches device updates the information related to results of health checkups on the back-end server based on the results of the health checkups. This allows other load-balancing to acquire the information from the cache device without repeatedly performing similar health checkups on the back-end server.

In some embodiments, the cache device skips updating to the information related to the results of health checkups on the back-end server when it receives the results of health checkups for the first time and updates the information when it receives the results for the second time. This measure allows each of the load-balancing devices in the system has an opportunity to perform health checkups on the back-end server.

As illustrated in the embodiments of the present disclosure, the cache device stores the information related to the results of health checkups on the back-end server so that the load-balancing devices may reduce the frequency to perform health checkups on the back-end server, which reduces the back-end server's pressure due to flows of health checkups.

The devices and network servers consistent with the embodiments of the present disclosure may include one or more processors, input/output ports, network connectors, and memory devices.

The memory devices includes non-transitory computer-readable medium for storing instructions, which, when executed by the one or more processors, cause the processors to perform the methods described above. The medium may be random access memory (RAM), or other non-volatile memory, such as read only memory (ROM), or flash memory. The memory device can be inside of a computer.

The non-transitory computer-readable storage medium can permanently or temporarily store information. It can be a mobile or stationary medium. The information may be computer-readable instructions, data structures, process modules, or other data. The computer-readable storage medium may include phase-change random access memory (PRAM), static random-access memory (SRAM), dynamic random-access memory (DRAM), other types of RAM, Electrically Erasable Programmable Read-Only Memory (EEPROM), DVD, other types of optical storage medium, magnetic tapes, magnetic drives, or other types of magnetic storage medium, to storage computer messages.

The illustrated methods, devices, servers, and systems may be performed by software, hardware, or a combination of software and hardware. For example, they may be implemented in an application-specific integrated circuit (ASIC), general purpose computers, or other hardware devices. In one embodiment, the steps and functions of a unit can be performed by a physical processor. In one embodiment, the steps and their relevant data structures can be stored in a non-transitory computer-readable storage medium, such as a RAM, a magnetic or optical drive, a magnetic disc and the like. In some embodiments, the steps or functions of the present disclosure can be implemented with hardware devices, such as circuits designed to work with the processor to execute the steps or functions.

In some embodiments, all or a portion of the methods can be implemented by computer programs, such as computer instructions, which, when executed by a computer, cause the computer to perform the methods or functions. These computer instructions can be stored in a portable or non-portable, non-transitory computer storage medium, can be transmitted by broadcasting or in a network, and/or can be stored in a memory device of a computing device. A device consistent with the embodiments of the present disclosure includes a memory device configured to store the computer instructions and a processor configured to execute the instructions to perform the methods or embodiments of the present disclosure.

Other embodiments of the invention will be apparent to those skill in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims. One of ordinary skill in the art will also understand that multiple ones of the above described steps or units may be combined as one step or unit, and each of the above described units may be further divided into a plurality of sub-units. A singular expression of a term in the present disclosure does not exclude that it can be plural. The ordinal numbers used in the present disclosure does not necessarily present the order of the steps or methods. The order of the steps or methods may be modified according to the practical needs.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for monitoring health of a server, the method being performed by a cache device and comprising:
    acquiring, by the cache device, information related to results of health checkups on the server based on an inquiry from a load-balancing device about the results of health checkups on the server, wherein the cache device connects to the load-balancing device via a network, and wherein the information related to results of health checkups on the server indicates whether another load-balancing device is determined to be monitoring the health of the server; and
    transmitting, by the cache device, information indicating whether another load-balancing device is determined to be monitoring the health of the server to the load-balancing device via the network, which causes the load-balancing device not to perform health checkups on the server when the another load-balancing device is determined to be monitoring the health of the server.

2. The method of claim 1, wherein the information related to results of health checkups on the server includes one or more of:
    the results of health checkups on the server; and
    whether or not the cache device has the results of health checkups on the server.

3. The method of claim 1, further comprising:
    updating the information related to the results of health checkups on the server, based on results of health checkups on the server provided by the load-balancing device; or
    updating the information related to the results of health checkups on the server to include that the load-balancing device is performing health checkups on the server or that the load-balancing device completes health checkups on the server.

4. The method of claim 3, further comprising:
    forwarding the updated information to a distributed cache memory device.

5. The method of claim 4, further comprising: directly updating the information related to the results of health checkups on the server based on the results of health checkups on the server provided by the load-balancing device.

6. The method of claim 4, further comprising:
    skipping updating the information related to the results of health checkups on the server provided by any load-balancing device when the results are received by the cache device for the first time; and
    updating the information related to the results of health checkups on the server when the results are received by the cache device for the second time.

7. The method of claim 6, further comprising:
    requesting the distributed cache memory device to write a main try key therein, the main try key being indicative of a first try to write the information related to the results of health checkups and being effective during a predetermined third time period; and
    requesting the distributed cache memory device to delete the main try key when the results are received by the cache device for the second time.

8. The method of claim 3, further comprising:
deleting the results of health checkups on the server when a difference between a time the results was last updated and the present time is greater than a first predetermined time period; and
updating the information related to the results of health checkups on the server to include that the cache device stores no results of health checkups on the server.

9. A method for monitoring health of a server, the method being performed by a load-balancing device and comprising:
inquiring, by the load-balancing device, a cache device about information of health checkups on the server, wherein the cache device connects to the load-balancing device via a network;
acquiring, by the load-balancing device, information related to results of health checkups on the server returned from the cache device via the network, wherein the information related to results of health checkups on the server indicates whether another load-balancing device is determined to be monitoring the health of the server;
processing the information related to the results of health checkups on the server to obtain the results of health checkups on the server; and
causing the load-balancing device not to perform health checkups on the server when the information indicates that the another load-balancing device is determined to be monitoring the health of the server.

10. The method of claim 9, further comprising:
when the obtained information related to the results of health checkups on the server indicating that the server is receiving health checkups, performing again the steps of claim 9 after a lapse of a second predetermined time period;
when the obtained information related to the results of health checkups on the server includes the results of health checkups on the server, acquiring the results; or
when the obtained information related to the results of health checkups on the server indicating that the cache device has no results of health checkups on the server, performing health checkups on the server.

11. The method of claim 10, wherein the performing health checkups on the server includes:
when performing the health checkups on the server, informing the cache device that the server is receiving the health checkups; and
when the health checkups on the server is completed, informing the cache device that the health checkups on the server is completed.

12. The method of claim 10, wherein the performing health checkups on the server includes:
after concluding the health checkups on the server, forwarding results of the health checkups on the server to the cache device.

13. A cache device for monitoring health of a server, comprising:
a first apparatus configured to acquire information related to results of health checkups on the server based on an inquiry from a load-balancing device about the results of health checkups on the server, wherein the cache device connects to the load-balancing device via a network, and wherein the information related to results of health checkups on the server indicates whether another load-balancing device is determined to be monitoring the health of the server; and
a second apparatus configured to transmit information indicating whether another load-balancing device is determined to be monitoring the health of the server to the load-balancing device via the network, which causes the load-balancing device not to perform health checkups on the server when the another load-balancing device is determined to be monitoring the health of the server.

14. The cache device of claim 13, wherein the information related to results of the health checkups on the server includes one or more of:
the results of health checkups on the server; and
whether or not the cache device has the results of health checkups on the server.

15. The cache device of claim 13, further comprising:
a third apparatus configured to update the information related to the results of health checkups on the server, based on results of health checkups on the server provided by the load-balancing device; and
a fourth apparatus configured to update the information related to the results of health checkups on the server to include that the load-balancing device is performing health checkups on the server or that the load-balancing device completes health checkups on the server.

16. The cache device of claim 15, wherein the third apparatus includes:
a first unit configured to forward the updated information to a distributed cache memory device.

17. The cache device of claim 16, wherein the third apparatus further includes: a second unit configured to directly update the information related to the results of health checkups on the server based on the results of health checkups on the server provided by the load-balancing device.

18. The cache device of claim 16, wherein the third apparatus further includes:
a third unit configured to skip the information related to the results of health checkups on the server provided by any load-balancing device when the results are received by the cache device for the first time; and
a fourth unit configured to update the information related to the results of health checkups on the server when the results are received by the cache device for the second time.

19. The cache device of claim 18,
wherein the third unit includes a first sub-unit configured to request the distributed cache memory device to write a main try key therein, the main try key being indicative of a first try to write the information related to the results of health checkups and being effective during a predetermined third time period; and
wherein the fourth unit includes a second sub-unit configured to request the distributed cache memory device to delete the main try key when the results are received by the cache device for the second time.

20. The cache device of claim 15, further comprising:
a fifth apparatus configured to
delete the results of health checkups on the server when a difference between a time the results was last updated and the present time is greater than a first predetermined time period; and
update the information related to the results of health checkups on the server to include that the cache device stores no results of health checkups on the server.

21. A load-balancing device for monitoring health of a server, comprising:

a sixth apparatus configured to inquire a cache device about information of health checkups on the server, wherein the cache device connects to the load-balancing device via a network;

a seventh apparatus configured to acquire information related to results of health checkups on the server returned from the cache device via the network, wherein the information related to results of health checkups on the server indicates whether another load-balancing device is determined to be monitoring the health of the server; and an eighth apparatus configured to process the information related to the results of health checkups on the server to obtain the results of health checkups on the server, wherein the load-balancing device is configured not to perform health checkups on the server when the information indicates that the another load-balancing device is determined to be monitoring the health of the server.

22. The load-balancing device of claim 21, wherein the eighth apparatus includes:

a fifth unit configured to, when the obtained information related to the results of health checkups on the server indicating that the server is receiving health checkups, instruct the sixth apparatus, the seventh apparatus and the eighth apparatus to again perform their respective actions after a lapse of a second predetermined time period;

a sixth unit configured to, when the obtained information related to the results of health checkups on the server includes the results of health checkups on the server, acquire the results; and a seventh unit configured to, when the obtained information related to the results of health checkups on the server indicating that the cache device has no results of health checkups on the server, perform health checkups on the server.

23. The load-balancing device of claim 22, wherein the seventh unit includes:

a third sub-unit configured to, when performing the health checkups on the server, inform the cache device that the server is receiving the health checkups; and a fourth sub-unit configured to, when the health checkups on the server is completed, inform the cache device that the health checkups on the server is completed.

24. The load-balancing device of claim 22, wherein the seventh unit includes:

a fifth sub-unit configured to, after concluding the health checkups on the server, forwarding results of the health checkups on the server to the cache device.

25. A non-transitory computer readable medium that stores a set of instructions that is executable by at least one processor of a cache device to cause the cache device to perform a method, the method comprising:

acquiring, by the cache device, information related to results of health checkups on the server based on an inquiry from a load-balancing device about the results of health checkups on the server, wherein the cache device connects to the load-balancing device via a network, and wherein the information related to results of health checkups on the server indicates whether another load-balancing device is determined to be monitoring the health of the server; and transmitting, by the cache device, information indicating whether another load-balancing device is determined to be monitoring the health of the server to the load-balancing device via the network, which causes the load-balancing device not to perform health checkups on the server when the another load-balancing device is determined to be monitoring the health of the server.

26. A non-transitory computer readable medium that stores a set of instructions that is executable by at least one processor of a load-balancing device to cause the load-balancing device to perform a method, the method comprising:

inquiring, by the load-balancing device, a cache device about information of health checkups on the server, wherein the cache device connects to the load-balancing device via a network;

acquiring, by the load-balancing device, information related to results of health checkups on the server returned from the cache device via the network, wherein the information related to results of health checkups on the server indicates whether another load-balancing device is determined to be monitoring the health of the server;

processing the information related to the results of health checkups on the server to obtain the results of health checkups on the server; and causing the load-balancing device not to perform health checkups on the server when the information indicates that the another load-balancing device is determined to be monitoring the health of the server.

* * * * *